(12) United States Patent
Tarlow

(10) Patent No.: US 6,799,506 B2
(45) Date of Patent: Oct. 5, 2004

(54) VACUUM PRODUCING APPLIANCE

(75) Inventor: Kenneth A. Tarlow, Corte Madera, CA (US)

(73) Assignee: Sylmark Holdings Limited (IE)

( * ) Notice: Subject to any disclaimer, the term of this patent is extended or adjusted under 35 U.S.C. 154(b) by 0 days.

(21) Appl. No.: 10/437,120

(22) Filed: May 13, 2003

(65) Prior Publication Data

US 2003/0200874 A1 Oct. 30, 2003

Related U.S. Application Data

(63) Continuation of application No. 10/051,945, filed on Jan. 22, 2002, now Pat. No. 6,626,092.

(51) Int. Cl.$^7$ ............................. A47J 27/00; B65B 31/04
(52) U.S. Cl. ............................ 99/472; 417/411; 141/65
(58) Field of Search ............................... 99/472, 646 C, 99/476, 484, 495, 345, 340; 141/65, 95, 192; 417/437, 313, 411; 53/375.9, 390, 510

(56) References Cited

U.S. PATENT DOCUMENTS

| | | |
|---|---|---|
| 5,195,427 A | 3/1993 | Germano |
| 5,394,789 A | 3/1995 | Evans et al. |
| 5,570,628 A * | 11/1996 | Kiener et al. ................. 99/472 |
| 5,806,575 A * | 9/1998 | Tsay ............................. 141/65 |
| 6,019,034 A | 2/2000 | Ford, Sr. |

* cited by examiner

Primary Examiner—Reginald L. Alexander
(74) Attorney, Agent, or Firm—Kathy Mojibi Kavcioglu

(57) ABSTRACT

Vacuum producing appliance and associated food and beverage holding vessels, the vacuum producing appliance with a hollow housing, the housing enclosing a vacuum pump, a pressure switch, a vacuum holding tank, a solenoid valve, a power switch, and associated tubing to attach the components to each other. A conical shaped concavity built into the bottom of the housing capable of drawing air from a vessel and passing it through the vacuum. A plurality of vessel sealing lids interact with the vacuum producing appliance, the lids having a convex conical shape at their top surface that can interface in an air tight way with a mating concave conical shape located in the main housing the lids having a check valve that allows air to leave the lid but not reenter it. The lids are capable of interfacing in an air tight way with the mouth of a jar, bottle, can or the like so that a vacuum can be drawn in the jar, bottle or can. A plurality of unique food or beverage holding vessels such as a serving tray, a tumbler, a soup bowl, an ice cream bowl or the like, each vessel being of double walled construction and each vessel being fitted with said convex conical interface and the check valve so that the vacuum producing appliance can interface with the food or beverage holding vessels and cause a vacuum to be created within the inner and outer walls.

15 Claims, 7 Drawing Sheets

VACUUM PRODUCING APPLIANCE

CROSS-REFERENCE TO RELATED APPLICATIONS

The present application is a continuation of U.S. application Ser. No. 10/051,945 filed Jan. 22, 2002, now U.S. Pat. No. 6,626,092, which is incorporated herein by reference in its entirety.

BACKGROUND OF THE INVENTION

I. Field of the Invention

This invention relates generally to the field of food storage and holding devices, and more particularly to a vacuum producing appliance that cooperates with an assortment of food and beverage holding devices.

Food and beverage storing and holding vessels have traditionally been constructed of materials such as metal, glass or plastic. Traditionally, these vessels are of a single wall construction. Within the last one hundred years, vacuum packing has been employed to help keep foods fresh longer. The lack of air in the food container helps prevent bacteria from growing on the food.

Foods and beverages have been stored in vessels for thousands of years. Often the vessels had lids that fit tightly and helped keep the contents from spoiling or becoming contaminated by dirt or the like.

II. Description of Related Art

Unfortunately, when a vacuum packed food storing vessel is opened, the vacuum is lost thereby allowing bacteria in the trapped air within the vessel to grow more rapidly and hastening the unsuitability of the food for human consumption. Additionally, foods or beverages that are heated or cooled and then stored or held in single walled containers, loose their heat or cold quality rather quickly because the vessel usually does not have good insulating qualities. Double walled carafes or the like have been constructed, primarily out of glass or metal, where the space between the walls is evacuated thereby creating a good insulator, however these types of containers tend to be restricted in shape and size due to manufacturing restrictions.

SUMMARY OF THE INVENTION

An object of the invention is to provide a vacuum producing appliance that can quickly create a vacuum within the walls of a food storing vessel such as a jar, bottle or can so that the food stored therein is preserved for a longer period than if there were no vacuum involved.

Another object of the invention is to provide a vacuum producing appliance that can quickly create a vacuum within the walls of a plurality of unique double walled vessels such as a serving tray or a drinking tumbler thereby producing an insulating effect that helps said double walled vessel keep the food or beverage contained therein hot or cold for a longer period than if there were no vacuum involved. Even though the vacuum may be considered temporary, lasting approximately eight hours, it can be easily recharged by the vacuum producing appliance of the present invention.

Another object of the invention is to provide a vacuum producing appliance that can be affixed to the wall of a kitchen or the like.

A further object of the invention is to provide a vacuum producing appliance that is alternately capable of being placed on a counter top or the like.

In accordance with an embodiment of the present invention, a vacuum producing appliance and associated food and beverage holding vessel comprises a hollow housing, the housing enclosing a vacuum pump, a pressure switch, a vacuum holding tank, a solenoid valve, a power switch, and associated tubing to attach the components to each other, the vacuum pump turned on by the power switch and turned off by the pressure switch when the vacuum holding tank has reached the proper vacuum level, the pressure switch activating the solenoid valve thereby sealing in the vacuum in the vacuum holding tank, an electrical line cord and plug that supplies power to the vacuum pump, a conical shaped concavity built into the bottom of the housing capable of drawing air from a vessel and passing it through the vacuum, a plurality of vessel sealing lids, the lids having a convex conical shaped at their top surface that can interface in an air tight way with a mating concave conical shape located in the main housing, the lids having a check valve that allows air to leave the lid but not to reenter it, the lids having a vacuum relief valve located on their top surface that can be operated by the user to relieve the vacuum within a vessel located below the lid, the lids having a rigid conical portion built into its lower surface, the lower conical portion having a soft rubber covering 202 around its circumference, the rubber portion capable of interfacing in an air tight way with the mouth of a jar, bottle, can or the like so that a vacuum can be drawn in said jar, bottle or can, the lids having a variety of diameters of said lower conical portion to allow the conical portion to fit a variety of diameters of food or beverage holding vessels such as a small diameter for a wine bottle, or a large diameter for a larger Ball jar, and a plurality of unique food or beverage holding vessels such as a serving tray, a tumbler, a soup bowl, an ice cream bowl or the like, each vessel being of double walled construction and each vessel being fitted with the convex conical interface and the check valve so that the vacuum producing appliance can interface with the food or beverage containing vessels and cause a vacuum to be created within the inner and outer walls, the vacuum acting as an insulating means for the food containing vessel.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 2 is a perspective view of the vacuum producing appliance that can sit on a counter or the like.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
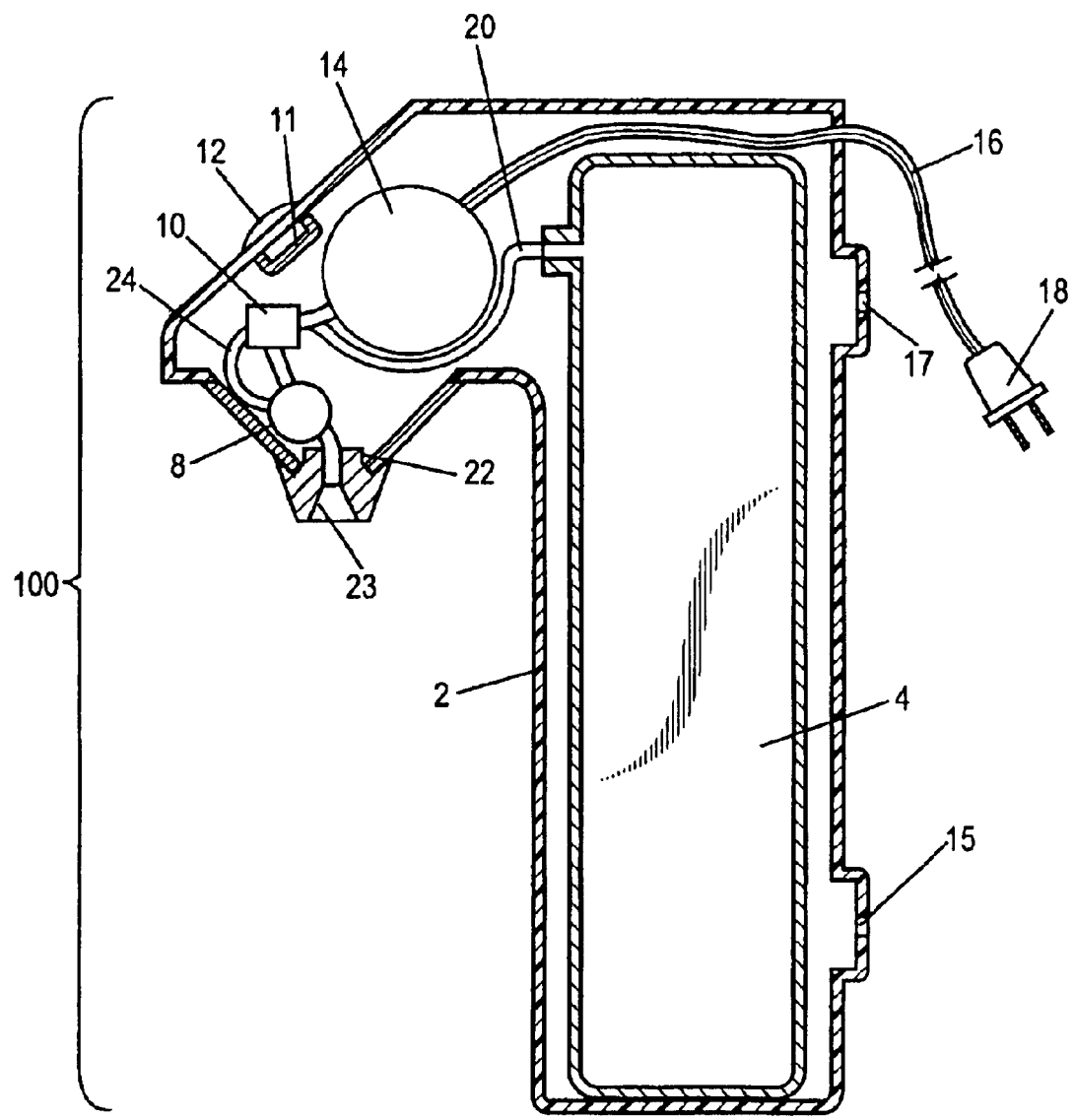
FIG. 1 is a side section view of the vacuum producing appliance of the present invention.

Referring now to FIG. 1 we see the vacuum producing appliance of the present invention 100 a housing 2 encloses a vacuum holding tank 4, a vacuum pump 14, a pressure switch 10, a solenoid valve 8 and an electrical switch 11. Flexible tubing 20 connects all the components associated with vacuum producing capability. Power cord 16 and plug 18 provide power to vacuum pump 14 and solenoid valve 8. In the preferred embodiment, vacuum pump 14 and solenoid valve 8 are powered by twelve volts DC. A standard wall pack transformer, not shown, converts 120 VAC to twelve volts DC. In this way, there is an option that the appliance of the present invention 100 can be operated by a rechargeable battery pack or by the power supply in an automobile, recreational vehicle, boat or the like. A concave, conical recess 23 located at the underside of the enclosure that is designed to receive a mating shape located in variety of unique items to be discussed below. When a person presses button 12, switch 11 opens solenoid valve 8 and turns on vacuum pump 14. Vacuum pump 14 also evacuates vacuum holding tank 4. The vacuum pump 14 is automatically turned off by vacuum pressure switch 10 when proper vacuum is reached. In this way, an instant vacuum can be created when the user pushes the on button 12 because the vacuum is coming from holding tank 4 as well as from vacuum pump 14. Protrusions 15, 17 in housing 2 have apertures that allow the entire unit 100 to be hung on screws that are mounted on a wall.

Figure 2:
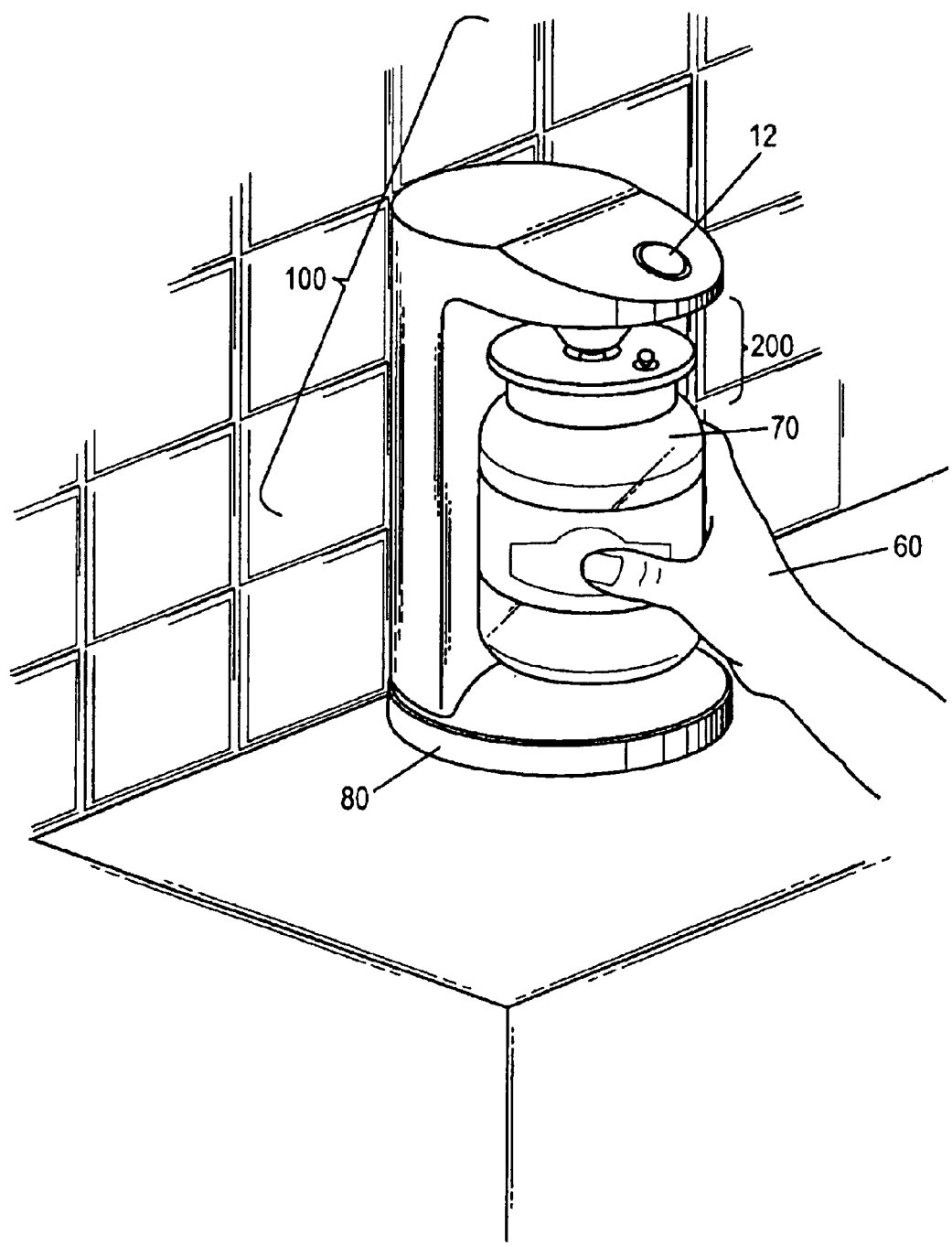

FIG. 2 is a perspective view of the vacuum appliance of the present invention 100 and associated vacuum lid assembly 200 and a standard food storing jar 70. In this version, base plate 80 allows the appliance 100 to sit on a counter top. In this view a person 60 has opened a glass jar that contains a food such as applesauce. Upon opening the jar 70 for the first time, the user has caused the vacuum that was employed within the jar to keep the applesauce fresh, to be depleted. Now the user 60 wants to store the applesauce for future use. Normally, the user would screw on the metal lid that came with the jar, however, since the vacuum within the jar has been lost, the remaining applesauce is exposed to damaging bacteria that is in the air trapped within the jar. Instead of screwing on the lid that came with the jar, the user 60 uses a lid 200 that is specially designed to interface with the vacuum producing appliance 100 of the present invention. When the user presses button 12, a vacuum is immediately released from the vacuum holding tank within the appliance 100 and causes a vacuum condition within the jar 70 thereby re-vacuumizing the jar and retarding the growth of unwanted bacteria within the jar 70.

Figure 3:
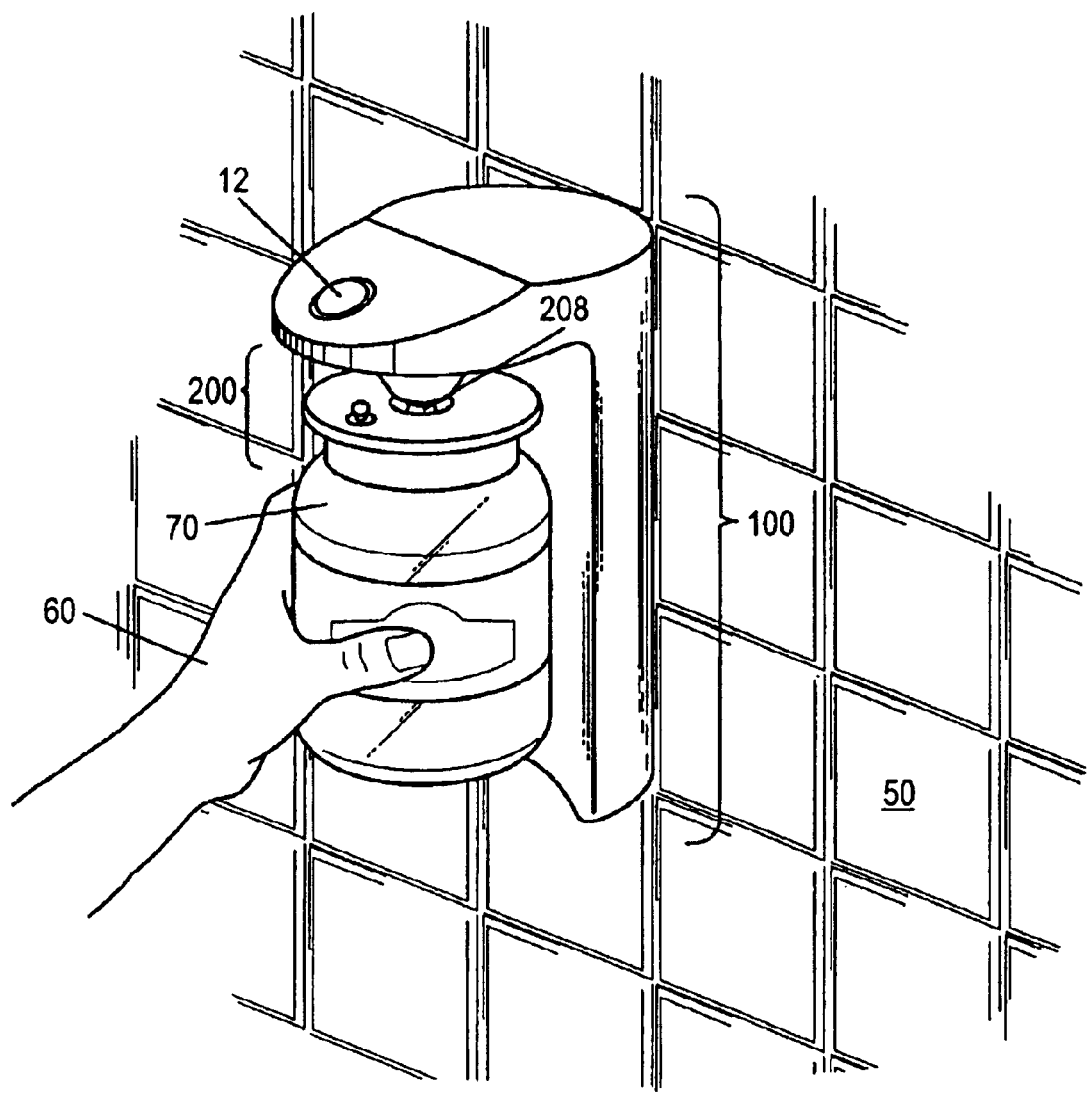
FIG. 3 is a perspective view of the vacuum producing appliance that is mounted to a wall.

FIG. 3 shows the present vacuum appliance 100 in a wall 50 mounted format. In this format the user can insert a jar, can or bottle of any length for the purpose of re-vacuumizing. The remaining numbered elements will be discussed in FIG. 4.

Figure 4:
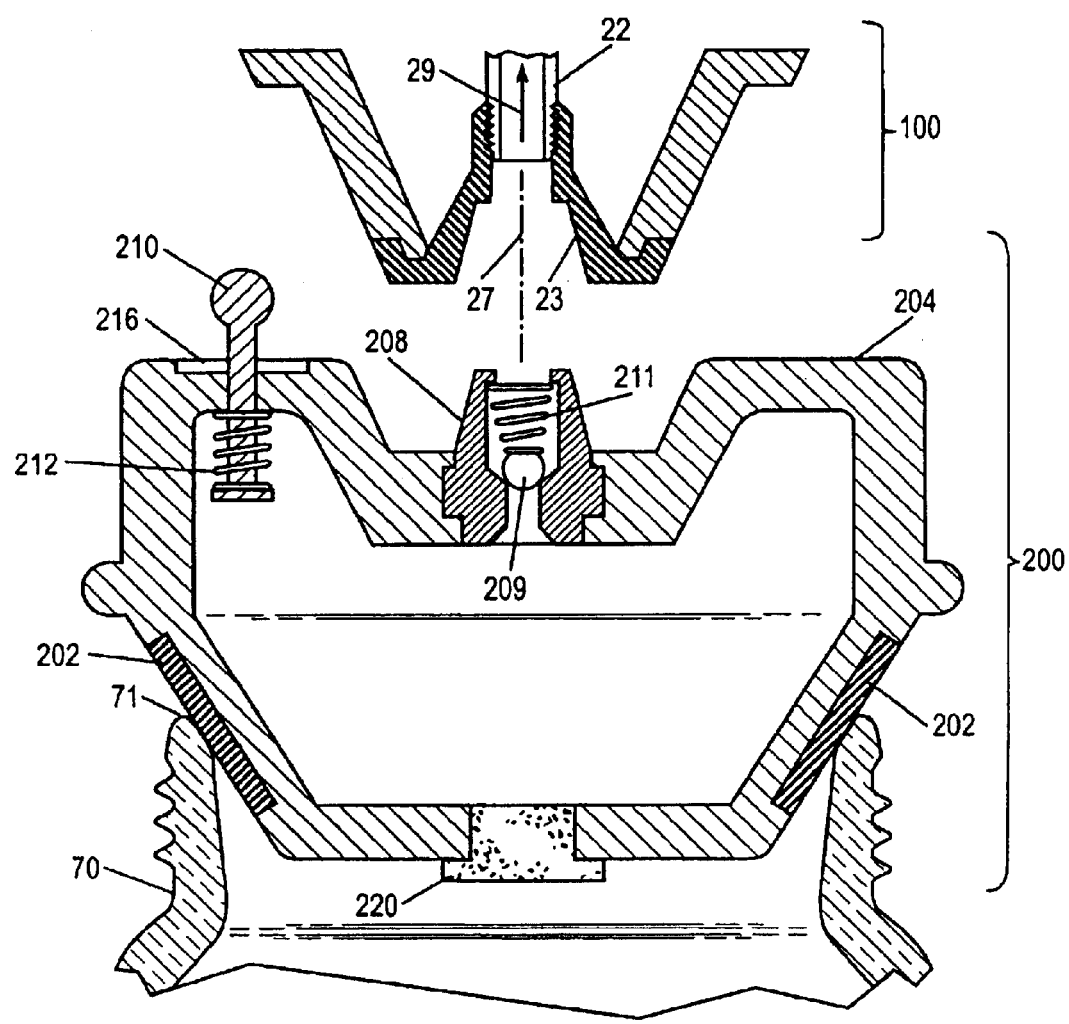
FIG. 4 is a side section view of the vacuum lid of the present invention.

FIG. 4 shows a side section view of a lid assembly 200 as well as the interface portion of vacuum appliance 100 and the lip 71 portion of jar 70. The lid assembly 200 is comprised of a main body 204, a check valve assembly 208 having a built in ball 209 and spring 211, a vacuum release valve comprised of pull knob 210, gasket 216, and spring 212. A conical shaped bottom portion of main body 204 includes a resilient gasket material that can help create an air tight seal with jar lip 71. The conical nature of lower main body 204 allows the lid assembly 200 to be used with jars having a variety of diameters of opening lips. The lids 200 may be made available in a set of three or four lids that will cover most of the diameters of standard jars and cans. Special lids can be made for narrow diameters such as wine bottles. Also included in the lid assembly 200 is an air plug 220 that lets air pass through but not liquid. The convex conical portion of check valve 208 is designed to interface, in an air tight way, with the concave conical 23 portion of appliance housing 100 as shown by dotted line 27. When a vacuum is pulled, as indicated by arrow 25, air is forced from the inside of jar 70 and through filter plug 220 and then through check valve 208. When the vacuum pressure from appliance 100 is stopped, the ball 209 in check valve 208 returns to its rest position thereby sealing in a vacuum within jar 70. When the user wants to reopen the jar 70, he or she pulls on vacuum release knob 210 causing gasket 216 to lift up and release the vacuum within jar 70.

Figure 5:
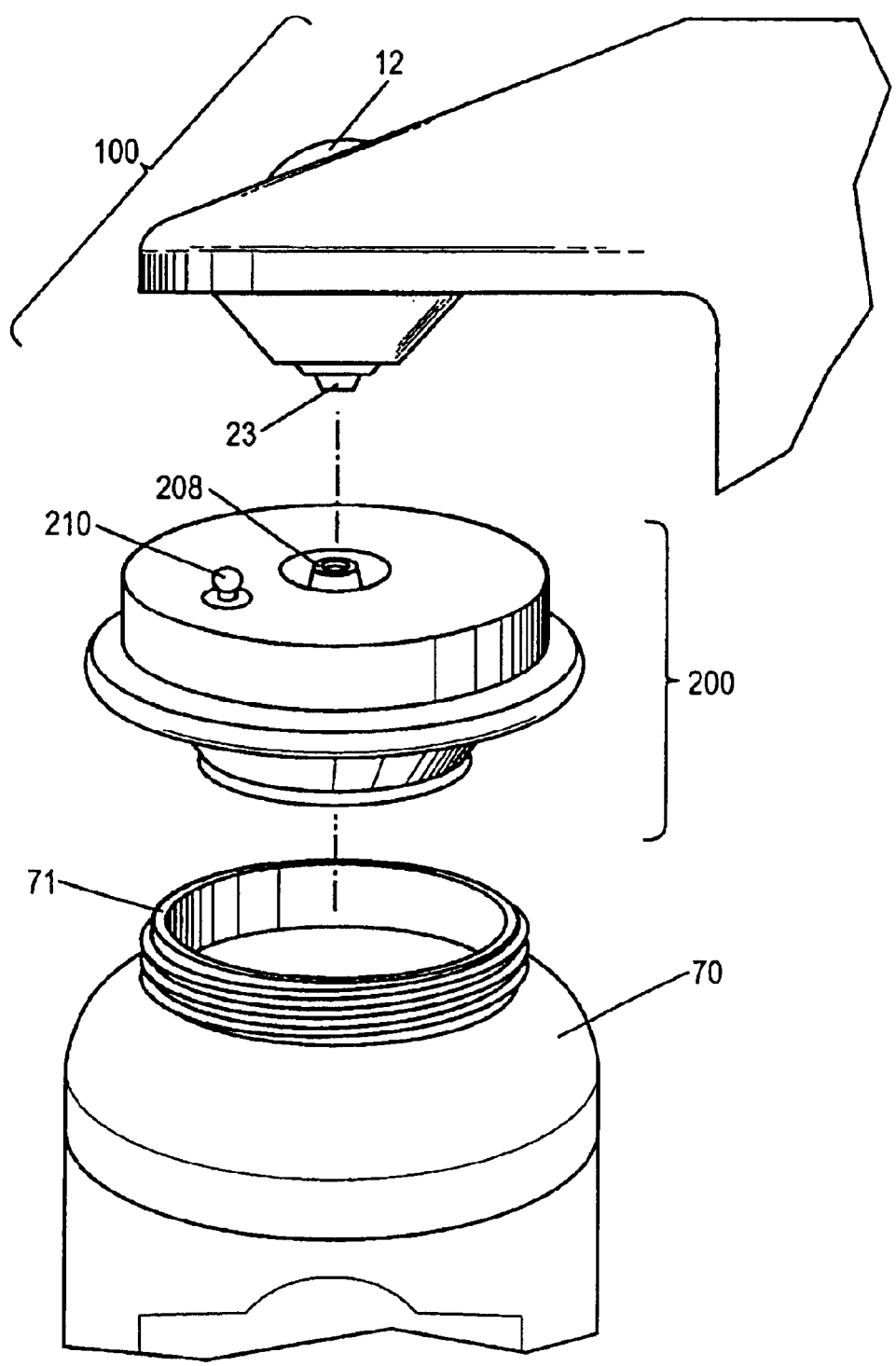
FIG. 5 is an exploded view of the vacuum appliance, lid and standard jar.

FIG. 5 shows a perspective view of a portion of appliance 100 as well as lid assembly 200 and jar 70. The user places lid assembly 200 on the lip 71 of jar 70. He or she then places the outer, conical, convex portion of check valve 208 onto the mating conical concave portion 23 of appliance 100. The user can then press button 12 to instantly create a vacuum within jar 70. Lid assemblies 200 of different diameters can be easily envisioned that can act as an sealing member for such diverse items as wine bottles, canned goods, jars having a variety of diameters of openings.

Figure 6:
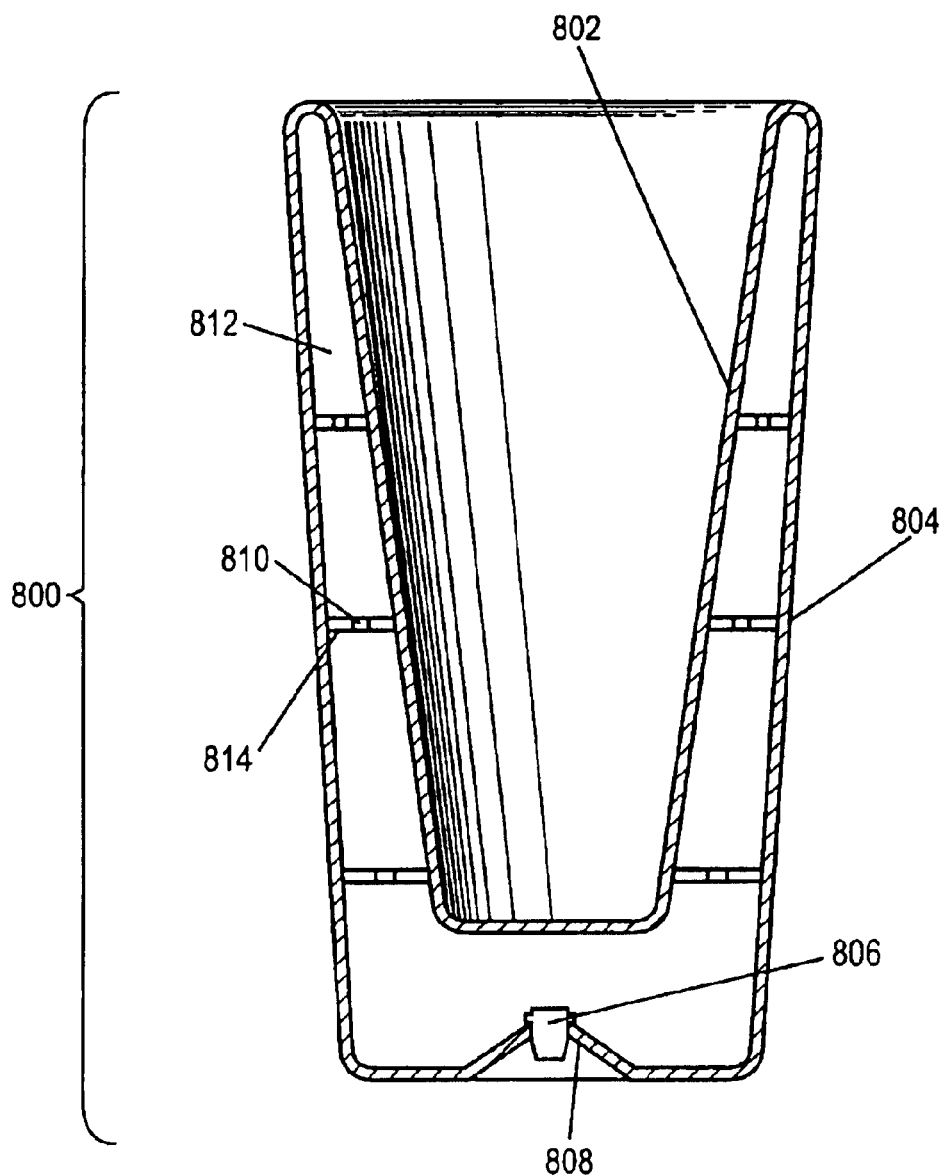
FIG. 6 is a section view of a drinking vessel.

FIG. 6 shows a drinking vessel, otherwise known as a tumbler 800. The tumbler 800 can be molded of high impact, injection molded plastic such as polycarbonate. The unique feature of this drinking vessel is that it is a double walled vessel comprised of outer wall 804 and inner wall 802. A concave conical shape 808 has a check valve 806 at its center that is similar in size to the exterior conical shape of check valve 208 in lid assembly 200. This interface allows the user to insert the convex conical shape of the outside of check valve 806 into the convex receptacle 23 located in appliance 100. The user can then create a vacuum inside the walls of tumbler 800 thereby increasing the insulating quality of the tumbler which, in turn, increases the time that a liquid held within the tumbler 800 will stay hot or cold. Ribs 814 keep the outer and inner walls 804, 802 from collapsing into each other. Apertures 810 allow the air within the tumbler 800 to be removed from all parts of the interior of the tumbler assembly 800.

Figure 7:
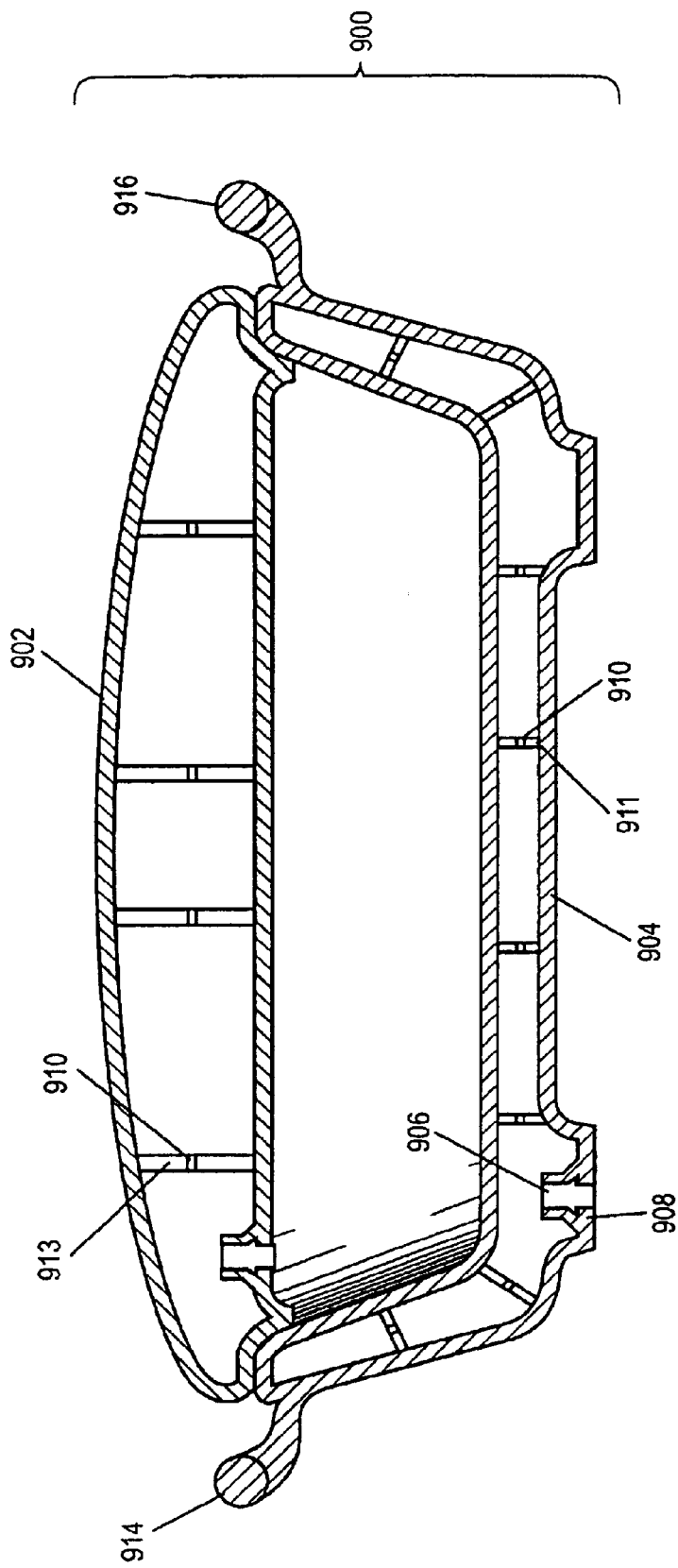
FIG. 7 is a section view of a serving tray and lid.

FIG. 7 shows a serving tray and lid assembly 900. In the preferred embodiment the assembly is constructed of high impact injection molded plastic such as polycarbonate, but may also be constructed of other rigid materials such as metal or glass. The lid 902 has a double walled construction and also includes check valve assembly 905 that can plug into interface 23 located in appliance 100. In this way a vacuum can be drawn within the walls of lid 902. Ribs 913 keep the outer walls from collapsing inward toward each other. Apertures 910 allows all the air to be evacuated from lid 902. Similarly, serving tray 904 is also a double walled construction and also has a check valve interface 903 within recessed area 908.carry handles 914, 916 allow the serving tray to be carried in the normal way. Additional food holding products can be easily envisioned that would be in within the scope of the present invention in that they have double walls and the check valve interface. These products include mugs, soup bowls, ice cream dishes, wine bottle holders and the like. Traditionally, vacuumized containers have not been made out of materials such as plastic because, even though plastic such as polycarbonate is a relatively non porous material, it still has microscopic pours that can let a vacuum be dissipated over a period of a few weeks or months. In the present case, since the user can re-vacuumize the unique food holding products of the present invention quickly and easily through the use of the present vacuum producing appliance 100, and since the food holding products herein described such as a tumbler 800 or a serving tray 900 need to retain their effective insulating quality for only a few hours, the plastic construction proposed in the present invention becomes a viable solution.

In the above described and illustrated way, a person, using the appliance and associated elements of the present invention can quickly re-vacuumize a jar or can of food or can create a vacuum within the walls specially designed food holding vessels thereby increasing the insulating ability of the vessel.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A vacuum producing appliance, comprising:
   a housing including a power switch and a check valve receptacle for receiving a check valve;
   a vacuum holding tank disposed within the housing;
   a pressure switch coupled to a vacuum holding tank;
   a vacuum pump coupled to the holding tank, the vacuum pump being actuated by the pressure switch;
   a valve that couples the vacuum pump and the vacuum tank to the check valve receptacle, wherein the power switch actuates the vacuum pump and the valve.

2. The appliance of claim 1, further comprising a power supply source.

3. The appliance of claim 1 wherein the power supply is one of an electrical line cord and a battery source.

4. The appliance of claim 1, further comprising a lid having a check valve configured to mate with the check valve receptacle of the housing.

5. The appliance of claim 4, wherein the lid includes a relief valve.

6. The appliance of claim 1, further comprising one of a food holding vessel and a beverage holding vessel, each vessel having a check valve configured to mate with the check valve receptacle of the housing.

7. The appliance of claim 1, wherein the housing includes protrusions mounting the housing to a wall.

8. The appliance of claim 1, wherein the housing includes at least one hole for mounting the housing to a wall.

9. The appliance of claim 1, wherein the housing includes a base plate for holding the housing in a sitting position when resting on a surface.

10. The appliance of claim 1, wherein the vacuum pump is actuated on by at least the power switch.

11. The appliance of claim 10, wherein the vacuum pump is actuated off by the pressure switch when the pressure in the vacuum tank reaches a predetermined pressure.

12. The appliance of claim 10, wherein the valve is actuated open by the power switch.

13. The appliance of claim 10, wherein the valve is actuated open and the vacuum pump is actuated on substantially simultaneously by the power switch.

14. The appliance of claim 1, wherein the check valve receptacle comprises a conical shaped cavity.

15. The appliance of claim 1, wherein the valve comprises a solenoid valve.

\* \* \* \* \*